(12) United States Patent
Hsu et al.

(10) Patent No.: US 6,297,732 B2
(45) Date of Patent: *Oct. 2, 2001

(54) RADAR/LASER DETECTION DEVICE WITH MULTI-SENSING AND REPORTING CAPABILITY

(75) Inventors: George Hsu; Chung-a Becky Oh; Christine Annette Sherer, all of Santa Rosa, CA (US)

(73) Assignee: Precision Navigation, Inc., Santa Rosa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,793

(22) Filed: Sep. 8, 1999

(51) Int. Cl.[7] ..................................................... B60Q 1/00
(52) U.S. Cl. .......................... 340/439; 340/576; 340/506; 342/54; 342/70; 342/20
(58) Field of Search ................................ 340/429, 576, 340/506; 342/54, 70, 20

(56) References Cited

U.S. PATENT DOCUMENTS

| | | | |
|---|---|---|---|
| 4,594,583 | * | 6/1986 | Soko et al. ............................ 340/576 |
| 5,666,120 | * | 9/1997 | Kline et al. ............................ 342/20 |
| 5,678,650 | * | 10/1997 | Ishihara et al. ....................... 180/169 |
| 5,710,565 | * | 1/1998 | Shirai et al. ............................ 342/70 |
| 5,715,045 | * | 2/1998 | Dunne .................................... 356/28 |
| 5,741,966 | * | 4/1998 | Handfield ............................. 73/146.5 |
| 5,786,755 | * | 7/1998 | Cicchino et al. ..................... 340/506 |
| 5,786,765 | * | 7/1998 | Kumakura et al. ................... 340/576 |
| 5,954,781 | * | 9/1999 | Slepian et al. ......................... 701/96 |
| 5,990,821 | * | 11/1999 | Sakar .................................... 342/54 |

* cited by examiner

Primary Examiner—Daniel J. Wu
Assistant Examiner—Tai T. Nguyen
(74) Attorney, Agent, or Firm—Donald R. Boys; Central Coast Patent Agency Inc.

(57) ABSTRACT

A combination radar/laser detector with environmental sensors is programmed to provide a range of functions, including weather information, road conditions and the like, and in some cases to incorporate road-specific information in functionality. The road-specific information may be provided by roadside RF broadcast terminals. In a preferred embodiment the system monitors characteristics that indicate a driver's state of awareness, and audio alerts are provides when the system determines a driver is dozing or drifting toward a dozing state. In various embodiments a broad range of functionality is provided based on received and sensed parameters.

8 Claims, 5 Drawing Sheets

RADAR/LASER DETECTION DEVICE WITH MULTI-SENSING AND REPORTING CAPABILITY

FIELD OF THE INVENTION

The present invention is in the field of radar detection devices and pertains more particularly to methods and apparatus for providing and integrating multi-sensor capability into a radar detection platform and apparatus.

BACKGROUND OF THE INVENTION

One of the most popular electronic early-warning devices available to motorists is the radar-detection device. A radar-detection device senses radar signals emitted by radar guns used by various law-enforcement agencies to sense and gage the speed of passing motor vehicles. The range of a typical radar-sensing device exceeds that of most radar guns, thus providing an early warning to motorists of the radar presence. This gives a speeding motorist typically ample time to slow a vehicle before entering the range of a radar site.

Aside from radar detection, there are a variety of other sensing technologies that may be used to provide a motorist with information that relates to safety in operating a vehicle, or other warning data of impending hazards or conditions which may affect the immediate roadway or a stretch of roadway some distance ahead of the motorist.

While many types of vehicle sensors have been developed, they are available in the art in a somewhat limited fashion. The systems are generally singular in the technologies used and in implementation parameters. That is to say that most vehicular sensing systems are standalone systems such as a radar proximity-sensing system that is implemented separately from other types of systems such as, perhaps, a compass navigational system. Therefore, a motorist that whishes to benefit by virtue of having his or her vehicle equipped with multi-sensing capability must do so at considerable expense, purchasing and installing plural devices.

What is clearly needed is a method and apparatus for integrating various sensor capabilities into one unit thereby providing a platform capable of supporting the various technologies. Such a system would be less expensive to deploy, and more convenient to operate than multiple separate systems.

SUMMARY OF THE INVENTION

In a preferred embodiment of the invention a detection and reporting system for a vehicle is provided, comprising one or both of a radar and a laser detector for sensing radar or laser signals directed on the vehicle to track vehicle speed; one or more environmental sensors mounted on or in the vehicle for sensing environmental characteristics; a microcontroller for managing system functions; an electronic memory for storing data, algorithms, and operating routines; and a display for reporting system results to a user. The system monitors input from one or both of the radar and laser detector and from at least one environmental sensor, and uses the input in conjunction with system control routines to provide reports to the user via the display.

In alternative embodiments of the invention the one or more environmental sensors include sensors for one or more of inside temperature, outside temperature, acceleration/deceleration, wind velocity, wind direction, air pressure, humidity, or the Earth's magnetic field. There is also, in a preferred embodiment a magnetometer for sensing the Earth's magnetic field, and the system comprises circuitry and software enabling the microprocessor to cause to be displayed on the display at the user's choice, vehicle compass direction derived from readings from the magnetometer as well as detection of either radar or laser signals directed onto the vehicle.

Also in preferred embodiments there is an interactive user interface enabling the user to at least select alternative functions for the system. There may also be an RF receiver enabled to receive and decode data transmitted from extra-vehicular sources, which may be one or more roadside RF transmitters transmitting data and messages to the RF receiver in the vehicle. The messages transmitted by roadside transmitters may include data on road characteristics to be soon encountered by the vehicle, such as curve characteristics for the roadway and incline characteristics for the roadway.

In a preferred embodiment of the invention the user is a driver of the vehicle, and the system further comprises an audio system and doze-alert software executed in the background at times the vehicle is in motion, the system, via the doze-alert software, gathering sensor data and processing same, and comparing with stored data to make a determination as to the driver's state of awareness, and, in the event of determining the may doze or is dozing, sounding an audible warning alert to the driver. The doze-alert software in one embodiment operates on an escalating scheme, wherein separate determinations are made based on sensor inputs as to a level of danger, and separate alerts are made, each one more urgent than the last as determined danger increases.

In another aspect of the invention a method for alerting a driver of a vehicle to impending danger occasioned by the driver's level of awareness is provided, comprising steps of (a) determining vehicle characteristics that evidence lack of driver awareness; (b) providing sensors in the vehicle enabled to monitor the vehicle characteristics; (c) programming an electronic warning system to store characteristics as a standard that indicates lack of awareness, and to compare real-time characteristics to the stored standard; and (d) comparing real-time vehicle characteristics with the stored standard and sounding an alert for the driver if a match is found. In one embodiment in step (b) patterns of movement of the vehicle's steering mechanisms are monitored, and in step (c) real-time movement of steering mechanisms are compared with the standard. The program in other embodiments may store plural standards indicating different levels of awareness, and in step (d) escalating alerts are sounded.

In the various embodiments of the invention, several of which are taught in enabling detail below, for the first time a combination instrument is provided combining the well-known functions of a radar detector or a laser detector with other sensors, with the instrument programmed to use sensed and received information to provide a broad range of functions beyond simple radar or laser detection.

BRIEF DESCRIPTION OF THE DRAWING FIGURES

DESCRIPTION OF THE PREFERRED EMBODIMENTS

A multi-sensing detection system is provided in various embodiments of the present invention for the purpose of allowing many separate sensor functions to be economically incorporated into one unit that may be programmed and operated by a single microprocessor and use a single integrated display for a user interface. The methods and apparatus of the present invention are taught in enabling detail in various embodiments below.

Figure 1:
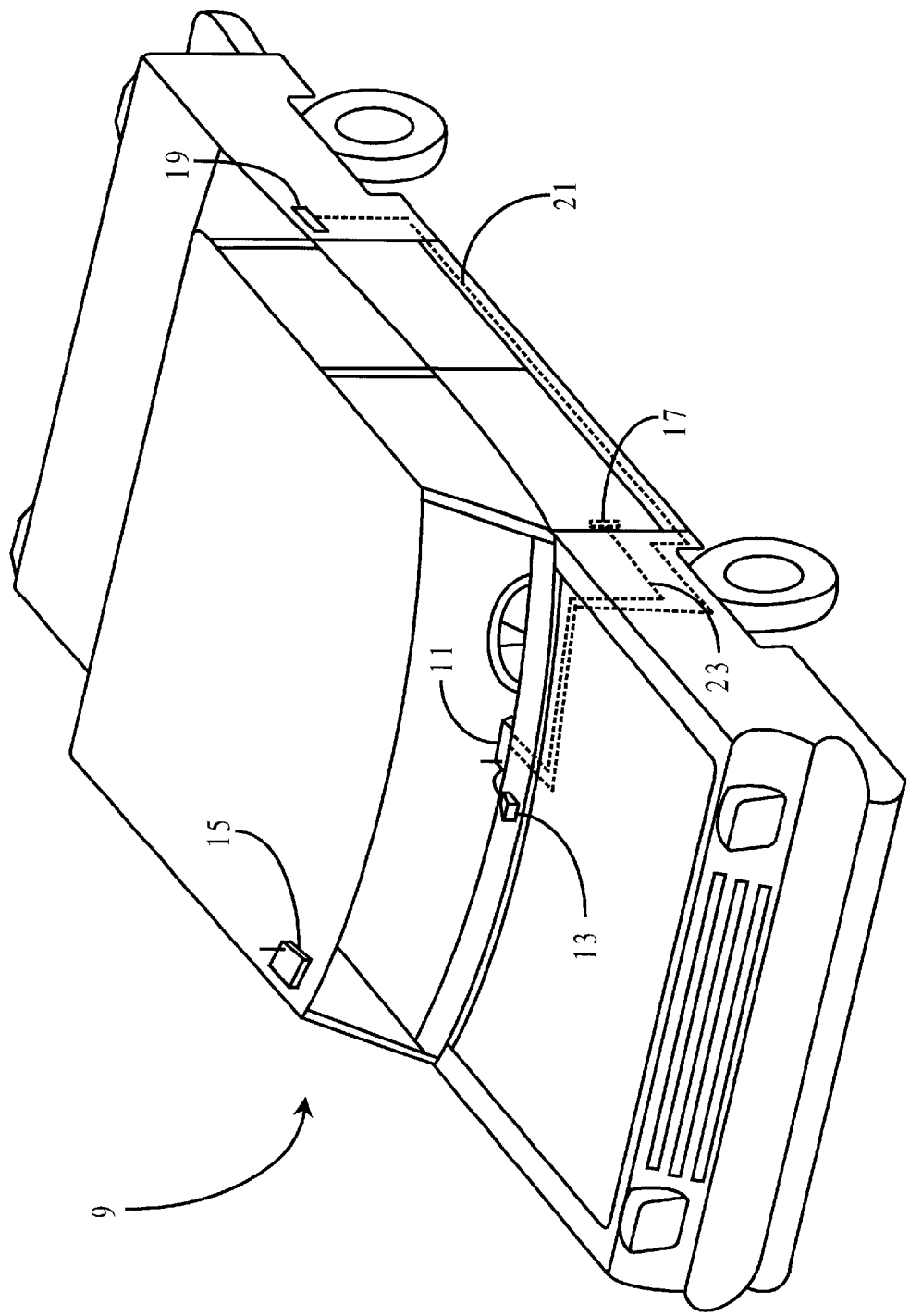
FIG. 1 is a perspective view of a passenger vehicle equipped with a multi-sensing detection system according to an embodiment of the present invention.

FIG. 1 is a perspective view of a vehicle 9 equipped with a multi-sensing detection system according to an embodiment of the present invention. Vehicle 9 has a multi-sensing detection system comprising at least a radar/laser detector unit 11, a radar/laser sensor 13, and an external sensor packet 15. Radar/Laser detector 11 is adapted for standard early warning detection of radar and/or laser-emitted signals used by such as law enforcement traffic officers to gauge and determine the speed of passing motor vehicles. Detector unit 11 may be mounted to any convenient location in vehicle 9 that is accessible to a user such as the traditional dash-mount position as illustrated herein.

Detector unit 11 has a radar/laser sensor 13 attatched thereto by a connecting cable. This illustration is to better describe the architecture of the apparatus, as the sensor(s) are in many cases included in detector unit 11. Radar/laser sensor 13 is adapted to sense and report radar/laser signals emanating from such as radar and laser guns used by law enforcement officers and the like, reporting the information in the form of an early warning to detector unit 11. In another embodiment sensor 13 may be enhanced for communication to detector 11 via RF signal or other wireless link. However, in this example sensor 13 communicates to detector 11 via cable connection. Sensor 13 may be mounted to the top of the dashboard of vehicle 9, or in any other convenient and operable position.

Sensor 13 may be adapted to detect radar signals, laser signals, or both. In some cases, there will be two separate sensors 13, one for radar, and one for laser, because radar signals are typically detected by a horn, and laser signals by a light-sensitive diode. In this embodiment, one sensor 13 is adapted to detect both a radar presence and a laser presence by including both types of sensors elements in the single sensor. The radar/laser detection function of detector 11 and sensor 13 is generally known in the art, therefore specific details regarding such known technology is not reproduced here, accept that in some embodiments, RF communication is used between sensor 13 and detector 11 instead of a connecting cable.

In addition to being adapted for standard radar and/or laser detection, detector 11 is also uniquely adapted to perform many more sensor-related operations in conjunction with and in addition to the radar/laser functions. A unique sensor packet 15 is provided and adapted to house various external sensors (external from detector 11 and, in this case external to vehicle 9) that may be desired and included in the overall capabilities of the multi-sensing and detection system of the present invention. Sensor packet 15 is, in this embodiment, a self-powered unit that communicates with detector 11 via RF signaling. However, in another embodiment, a power cable may be used to connect sensor packet 15 with a power source such as the electrical system of vehicle 9, batteries included with detector 11, or another provided power source.

Sensor packet 15 is illustrated in this example as mounted on a top surface of vehicle 9. However any convenient mounting location may be used as long as the included sensors can successfully operate from the chosen location.

A variety of sensors may be provided and housed in sensor packet 15 and detector 11. These may include, but are not limited to, an electronic compass circuitry, a temperature sensor, a wind shear sensor, an altimeter, and so on. The nature of each included sensor provided in packet 15 is considered in deciding on an optimal mounting location. For example, if a temperature sensor were to be included in packet 15, then it would be mounted to a location where additional heat from, for example, the engine compartment of vehicle 9 would not affect it's readings. Therefore, only external sensors that can successfully co-habitate in one mounting location would be included in packet 15.

In one embodiment, additional external sensors not included in packet 15 may be mounted at other locations on vehicle 9 and tethered to detector 11 (or be mounted in detector 11) via control lines routed through the interior of the vehicle. This circumstance is illustrated herein by element number 19 which is a blind spot sensor, and element number 17, which is an interior temperature sensor.

Blind spot sensor 19 is tethered to detector 11 by a control line 21. Sensor 19 is mounted to the rear quarter panel of vehicle 9 for the purpose of sensing any other vehicles that invade the driver's "blind area" of vision. A duplicate of sensor 19 and control line 21 would be mounted on the opposite side of vehicle 9 to cover the opposing blind spot.

There are a variety of known technologies used with blind spot sensors such as sensor 19. A common one is laser technology. Vehicle 9 may have existing sensor systems such as blind spot system 19 already installed before enhancement with the apparatus of the present invention. It is the intent of the inventors that such existing systems may, if desired, be integrated with detector 11 such that their pre-existing control means may be by-passed and replaced with control means provided by detector 11. In some cases, pre-existing control means may also be left intact such that either detector 11, or the original control means may operate the system. In this way, a pre-existing sensor system such as system 19 may still be operated when detector 11 is powered off.

Temperature sensor 17 is illustrated as installed in the door jam area of the passenger door of vehicle 9. Sensor 17 is tethered to detector 11 by a control line 23. Temperature sensor 17, as with sensor 19, may be a pre-existing system modified for interface with detector 11, or provided as an additional external sensor included with the multi-sensing and detection system of the present invention. There are many possible combinations of sensor capability that may be customized into the system of the present invention.

In addition to external sensors such as those included in packet 15, sensors may also be provided internally within the circuitry of detector 11. These sensors may include, but are not limited to an electronic compass, an altimeter, an accelerometer, an interior temperature sensor, an interior air quality sensor, and so on. Many types of sensors may be provided equally well as internal or external sensors. Some sensors however must be mounted externally such as wind shear or wind speed sensors.

In one embodiment, sensors may be standard and included with each multi-detection system of the present invention. In another embodiment, sensor capability may be customized for each desired implementation. In the latter case, a service may be provided to upgrade the system of the present invention to alter existing, or add new sensor capabilities. For example, commercial systems may be provided for the trucking industry. Recreational systems may be provided for four-wheel drive enthusiasts. There are many such possibilities.

It will be apparent to one with skill in the art that a multi-sensing and detection system such as the one described above may be provided having various sensor capability without departing from the spirit and scope of the present invention. For example, sensor capability for a standard passenger vehicle may differ by design than the sensor capability for a commercial vehicle.

It will also be apparent to one with skill in the art that actual sensors incorporated into any one sensor system may vary according to planned implementation and use of such a system. For example, a cab driver may not need a compass function whereas an off-road enthusiast frequenting unmapped backcountry roads would benefit from a compass function.

Figure 2:
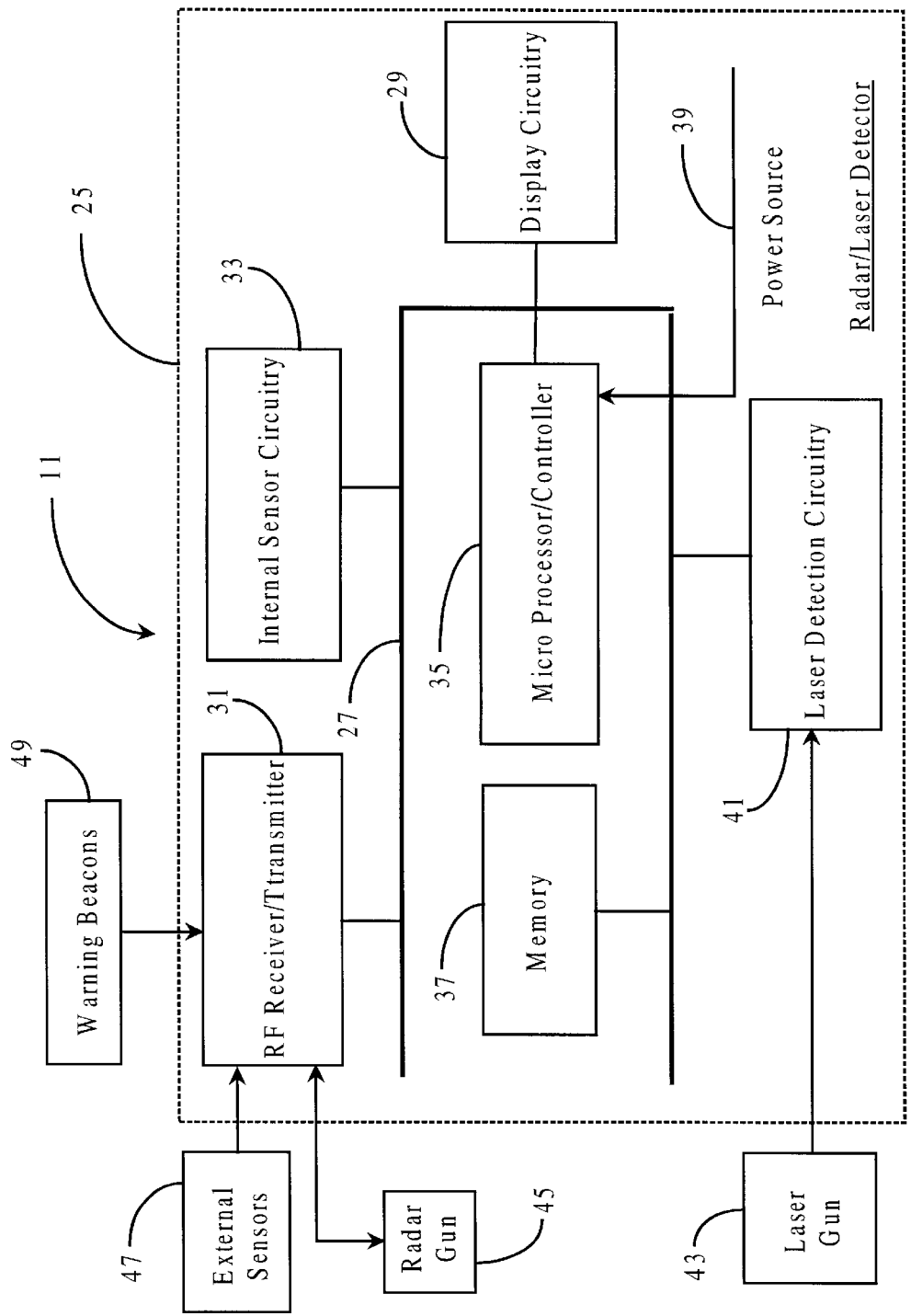
FIG. 2 is a block diagram illustrating internal circuitry of the detection system of FIG. 1, and interaction paths with external components according to an embodiment of the present invention.

FIG. 2 is a block diagram illustrating internal circuitry of detector unit 11 and its interaction paths with external components according to an embodiment of the present invention. Detector unit 11 is, as described above, is a dash-mounted device adapted principally as a radar and/or laser detector, and additionally enhanced as a multi-sensing and reporting unit. The multi-sensing enhancements may, in some embodiments, be added to existing radar/laser sensor systems with some modification, or they may be provided as features with new RD/LD systems.

Detector unit 11 is a computerized device capable of performing several dedicated and combined sensing/reporting functions by virtue of sensors incorporated and integrated with the provided circuitry illustrated herein.

Detector 11 in the embodiment shown has a microprocessor 35 adapted to manage and control various sensors and sensor reporting capabilities performed, as well as to manage functions of the principal radar/laser detection system. Microprocessor 35 is connected to a communication bus structure 27 for the purpose of communicating with other digital components that are part of or connected to detector 11. A memory module 37 is provided and contains the amount and type of memory required for performing intended functions such as storing code, caching sensor data, storing processing routines, and so on. Any suitable to mix of volatile and non-volatile memory such as a RAM/ROM combination including Flash RAM may be used as needed to implement and maintain operational integrity of detector 11.

Memory module 37 may be part of processor 35 and incorporated therein as one component, or it may be held separately such as a removable type of memory, several types of which are known in the art.

A display module 29 is provided and connected to processor 35. Module 29 contains all of the required circuitry adapted to allow data received from various sensors to be displayed on a suitable visual display means provided on the face of detector 11, which is visible to a user operating the device. In a preferred embodiment display 29 comprises an LCD display and the necessary circuitry to operate same.

Detector 11 has a capability of obtaining and disseminating information derived from any internal and/or external sensors, after processing by controller 35 using suitable driver and translation algorithms. An optional internal sensor packet 33 is provided and connected to bus structure 27. Sensor packet 33 contains all of the required circuitry and components needed to facilitate any desired internal sensor devices that are built into detector 11. Internal sensors that may be built in to detector 11 may include but are not limited to an altimeter, a magnetometer (compass), an accelerometer, an internal temperature sensor, and so on.

Provision of an internal sensor packet such as packet 33 exemplifies only one embodiment of the present invention wherein a specific sensor capability is optionally provided and internalized within detector 11. Such provision should not be construed as a limitation due to the fact that any of the above-described sensors may be provided externally as well.

An RF receiver/transmitter 31 is provided and connected to bus structure 27. RF receiver/transmitter 31 and is adapted to receive RF signals from and to send RF signals to a similar RF receiver/transmitter such as one provided in sensor packet 15 of FIG. 1. Circuitry for sensor packet 15 of FIG. 1 is not illustrated in this example, but will be detailed further below.

RF receiver/transmitter 31 has an RF converter/adapter (known in the art) incorporated therein for converting RF analog data into digital data for enabling transmission over bus structure 27. Similarly, digital data is converted to RF analog for RF transmission to external components such as sensor packet 15. RF receiver/transmitter 31 also receives signals from certain broadcast warning beacons represented herein by element number 49. Warning beacons 49 represent any RF signals that may be broadcast from construction sites on roadways, observation posts, special radio broadcast stations, and other sources. Warning beacons 49 may include weather information, road conditions ahead, alerts of heavy traffic, or any other conceivable warning or alert information that may be useful to a motorist.

Many existing RD/LD systems have RF capability for receiving such warning signals. One object of the present invention is to provide enhancement to such RF warnings by utilizing added sensor capability. For example, if a warning is received over an RF frequency reporting such as a slick road advisory, additional temperature and altimeter information may aid a motorist in better identifying the more dangerous sections of the roadway in question.

An optional radar/laser detection module 41 is provided and connected to bus structure 27. Module 41 contains all of the circuitry required for receiving and communicating serial data received from a tethered radar/laser sensor such as radar/laser sensor 13. In an embodiment wherein a radar/laser sensor such as sensor 13 is physically connected to detector 11 by a control line, then module 41 would receive the data directly through the control line as illustrated by the solid directional arrow. In this case RF communication would not be used for transmitting radar and laser gun data. Actual radar/laser detection circuitry may be held in sensor 13, module 41, or both. The primary function of module 41 in this example is to receive and communicate sensor data over bus 27.

In an embodiment wherein radar and laser detection functions are enhanced with RF communication capability, sensor 13, which may be a radar detection gun, a laser detection gun, or a dual function (radar and laser) gun, communicates via RF signal instead of data control line. In this circumstance module 41 would not be required. Radar and laser data would instead be received by receiver/transmitter 31 from a similar module (not shown) that would be provided in sensor 13. Any externally mounted sensors, such as the blind spot sensor of FIG. 1, that use radar or laser technologies may also use module 41 as an interface to detector 11. Alternatively, external sensors that communicate via control line may have a separate module or modules provided and assigned to them.

In a preferred embodiment of the present invention, more than one separate RF frequency is used to transmit data to detector 11 from a variety of possible sources. For example, sensor packet 15 of FIG. 1 may send data over more than one frequency. Warning beacons may transmit at still other frequencies. Still further, control frequencies, which represent the frequencies used to send command data to such as sensor packet 15 may be different than frequencies used to receive data. Microprocessor 35, in conjunction with memory 37 uses software-filtering routines for digital identification of data that is transmitted by different frequencies.

Detector 11 may be connected to an external power source as illustrated by directional arrow 39, which represents a connection to a power source such as a car battery. In another embodiment detector 11 may be self-powered such as by battery or other portable power cell.

In a preferred embodiment microprocessor is capable of processing combined sensor data received from more than one type of sensor in order to obtain a useable result representing a condition or state that is presentable to a user. For example, by combining available sensor data such as altitude, temperature, and barometric pressure, a motorist may predict a probability of ice danger on the roadway. If wind shear information is then incorporated into the result, an accurate prediction may be made that advises the motorist to pull over because of the high probability of danger according to the combined readings. Such functions are by algorithms and software stored in memory 37 and executed in controller 35. A threshold state representing the combined result could be saved in memory and compared to subsequent readings taken such as the next time the motorist travels the same route. If the subsequent readings approach the readings used to calculate the danger threshold (probable ice and strong cross-winds), then an audible alert may take over advising the motorist to pull over.

In addition to combining sensor data to produce safety warnings, known data may be incorporated into calculations performed by microprocessor 35. For example, a known grade of a particular roadway portion may be entered into the system of the present invention and be recalled to use in the calculation of sensor readings on that same stretch of roadway. Such information may be provided by RF signal from roadside sources for example. Other known data that may be entered into the system and incorporated into data calculation may include such as vehicle weight, center of gravity of the vehicle, known bank angles of specified turns in a roadway, and so on.

It will be apparent to one with skill in the art that a multi-sensing system such as the one described above may be used to combine specific real-time sensor readings, and incorporate known input data along with broadcast RF data such as from warning beacons and roadside sources, in order to calculate a presentable result that will represent an enhanced advisory that is not available from any single source. Only design and intent with regard to the capability of microprocessor 35 limits the level of complexity achievable in calculating and presenting safety advisory data based on combined input.

To illustrate a further example of the above capability, a trucker operating a commercial rig may use the multi-sensing and detection system of the present invention to provide speed advisories when negotiating known turns in a specific roadway. Known parameters such as the weight and center of gravity of the rig, the weight of the load that is being transported, and the specific parameters of a given turn may be input into the system as constants for the particular rig and used for this purpose. Such a speed-advisory may be further enhanced by incorporating real-time sensor data into the above parameters such as perhaps, wind speed and direction. If the recommended maximum speed calculated for a particular turn is 30 mph for the particular rig and load parameters, then the sensed presence of a 40-mph cross wind before the driver enters the turn may cause the recommended speed to be reduced by 10 mph.

If a particular route is well known, a speed advisory may be calculated for each questionable or difficult turn along the route. The operator of the rig may activate the calculation and sensors at any convenient point before entering a defined turn such as at a prior straightaway. Multiple turns on a given route could be serially numbered so that the driver does not activate the wrong parameters for a turn. In one embodiment, such a capability may be used in conjunction with an existing electronic map service and apparatus (known in the art) and automated such that each parameter set associated with a turn is coordinated to the mapped route so that there is no error in identification of parameters to a given turn.

Sensor packet 15 is, in one embodiment, a self-powered unit as was previously described with reference to FIG. 1. Therefore, sensor packet 15 has the capability of remote communication with detector 11. In an embodiment wherein the form of communication is RF wireless, and there is no physical control line or power line provided, then certain circuitry is required in packet 15 for enabling remote RF communication and operation. Such circuitry is detailed below.

Figure 3:
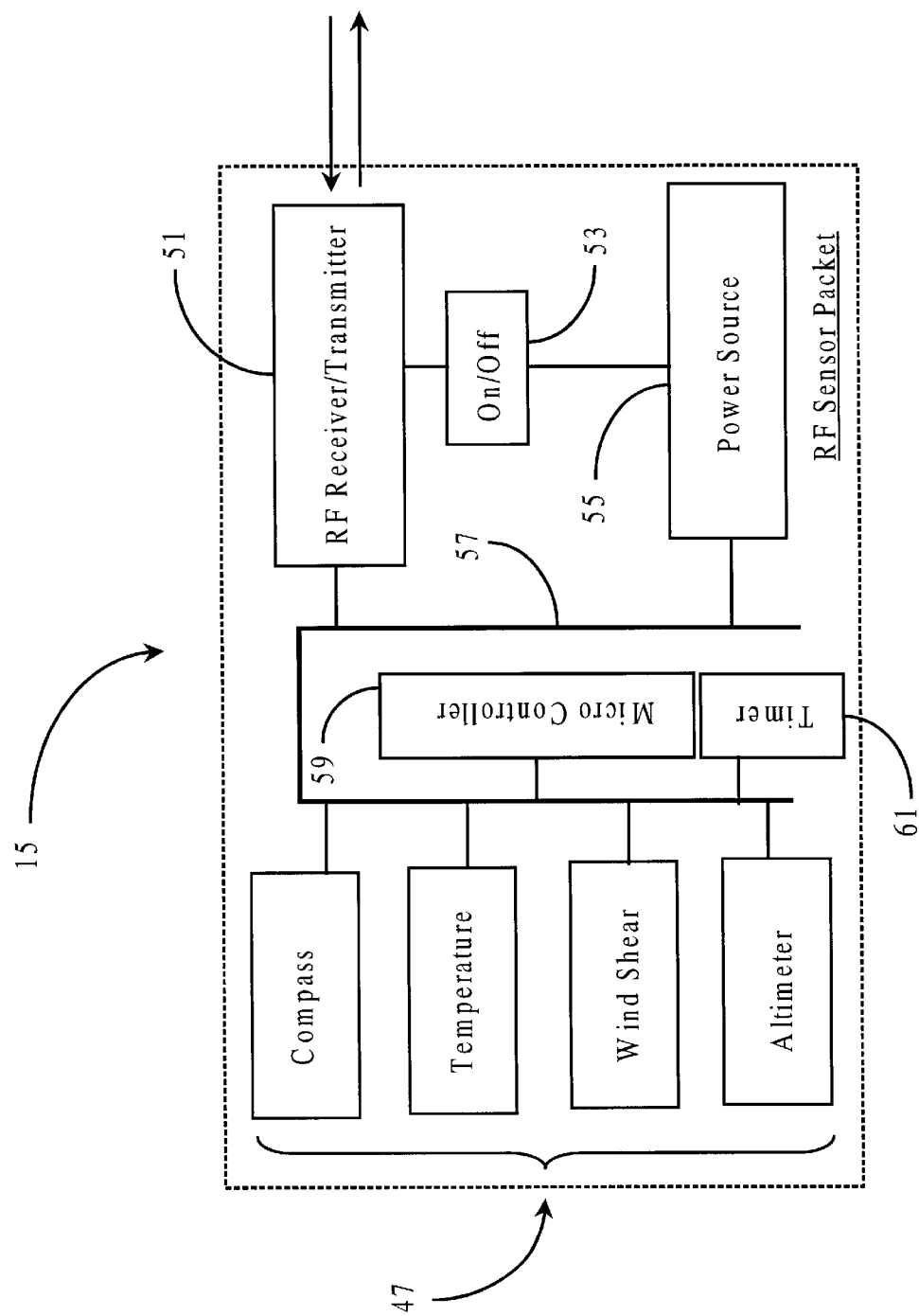
FIG. 3 is a block diagram of internal circuitry of the detection system of FIG. 1 according to an embodiment of the present invention.

FIG. 3 is a block diagram of the internal circuitry of sensor packet 15 of FIG. 1 according to an embodiment of the present invention. Packet 15 is, in this embodiment, a remote sensor module. An RF receiver/transmitter 51 is provided and adapted to enable RF communication with RF module 31 of FIG. 2. Module 51 may be self powered such that it is always held in an on state, but in a power-saving sleep mode. Module 51 may, in this embodiment, receive command data from detector 11, which provides instruction to packet 15 to direct it's operation and to power the remainder of the packet on or off. In this embodiment, bidirectional arrows illustrate the nature of RF communication between module 51 in sensor packet 15 and module 31 of detector 11 (FIG. 2).

An off/on power switch 53 is provided and adapted to select a power state for sensor 15 by affecting a self-contained primary power source 55. Switch 53 receives command from detector 11 through the receiver portion of module 51 as illustrated by connection thereto. If sensor packet 15 is in an idle or power off state, then an RF signal may be sent by detector 11 that activates power source 55 thereby booting up sensor packet 15.

Power source 55 may be a re-chargeable power cell or a battery that may be connected to or disconnected from packet 15 by switch 53 as illustrated by order of connection. Power source 55 is connected to a communication bus structure provided and adapted to manage communication to and from other components in packet 15. Such integral components include a micro controller 59, which is connected to bus 57 and adapted to manage the operations of packet 15 according to user instruction.

Controller 59 is adapted to manage communication between various included electronic sensors such as illustrated sensors 47, which are also shown connected to bus 57. Included in sensors 47 are, for example, an electronic compass, an electronic temperature sensor, an electronic windshear sensor, and an electronic altimeter. Sensors 47 may be varied in type and number according to alternative embodiments without departing from the spirit and scope of the present invention. The inventor intends only that sensors 47 as illustrated herein are exemplary of an optional combination of sensors that may be included in packet 15.

All sensors 47 are connected to bus structure 57 through suitable I/O circuitry. Therefore, sensors 47 may be controlled to operate individually, in combination, or in concert (all sensors). A timer function 61 is provided and adapted to apply an automated time function to sensor operation according to user direction. For example, sensors 47 may be timed to sense and report periodically, such as on the hour, half-hour, every 15 minutes, etc. Moreover, sensors 47 may be timed to execute and report independently from each other. For example, wind shear may be measured every 5 minutes while temperature is measured on the hour and so on.

Sensors 47 maintain their functional apparatus (not detailed) on the appropriate surface faces of sensor packet 15 if required of the particular sensor. For example, a wind shear or speed sensor would need direct interface with the wind and would therefore have the appropriate sensor interface. In contrast, an altimeter may be internally housed and would not need such surface exposure. Sensor architecture related to surface interfaces and the like is not illustrated herein, as it is generally known in the art.

In practice, a user operating detector 11 from inside vehicle 9 (FIG. 1) would access packet 15 via remoter RF signal. Presumably, a first transmission would be initiated to power sensor packet 15 to an on state. Subsequent control transmissions would be initiated to set-up desired operations and report sequences. As sensors 47 perform their stated functions, RF data is created and transmitted back to detector 11 via module 51. Module 51 has the same RF/digital and digital/RF adapter capabilities as described with module 31 of FIG. 2.

In the embodiment represented herein, sensor packet 15 is a remote device that is a complimentary device to detector unit 11 represented in FIG. 2. This example is that of a completely remote communication scenario wherein RF communication is used for sending control data and receiving sensor result data. This circumstance is not specifically required to practice the present invention, rather, it is represented as a preferred embodiment. In another embodiment, a physical control line may connect packet 15 to detector 11 such that all control data is sent to packet 15 via the control line. In this case, the control line may also provided power to packet 15. Also in this case, some sensor data may be sent back over the control line instead of via RF. In still another embodiment, another form of wireless remote communication may be used instead of RF communication. Infrared technology would be one such application among other possibilities. Therefore, the circuitry represented herein is only exemplary of one particular embodiment of many possible alternate embodiments.

It will be apparent to one with skill in the art that sensor packet 15 is not limited to the sensor capability illustrated herein. In one embodiment laser or radar sensing may be included in packet 15 instead of being provided separately as illustrated in FIG. 1. It is primarily due to economic practicability that some sensing function is maintained by physical control lines rather than RF transmission capability. One such example would be an interior temperature gauge such as gauge 17 described in FIG. 1. Another would be a blind spot sensor system using such as sensor 19 also described in FIG. 1.

In order to provide a convenient means of interface between a user and the multi-sensing and reporting system of the present invention, detector 11 is provided with an exemplary user-interface panel installed on it's user-facing surface. Such a user interface will be detailed below.

Figure 4:
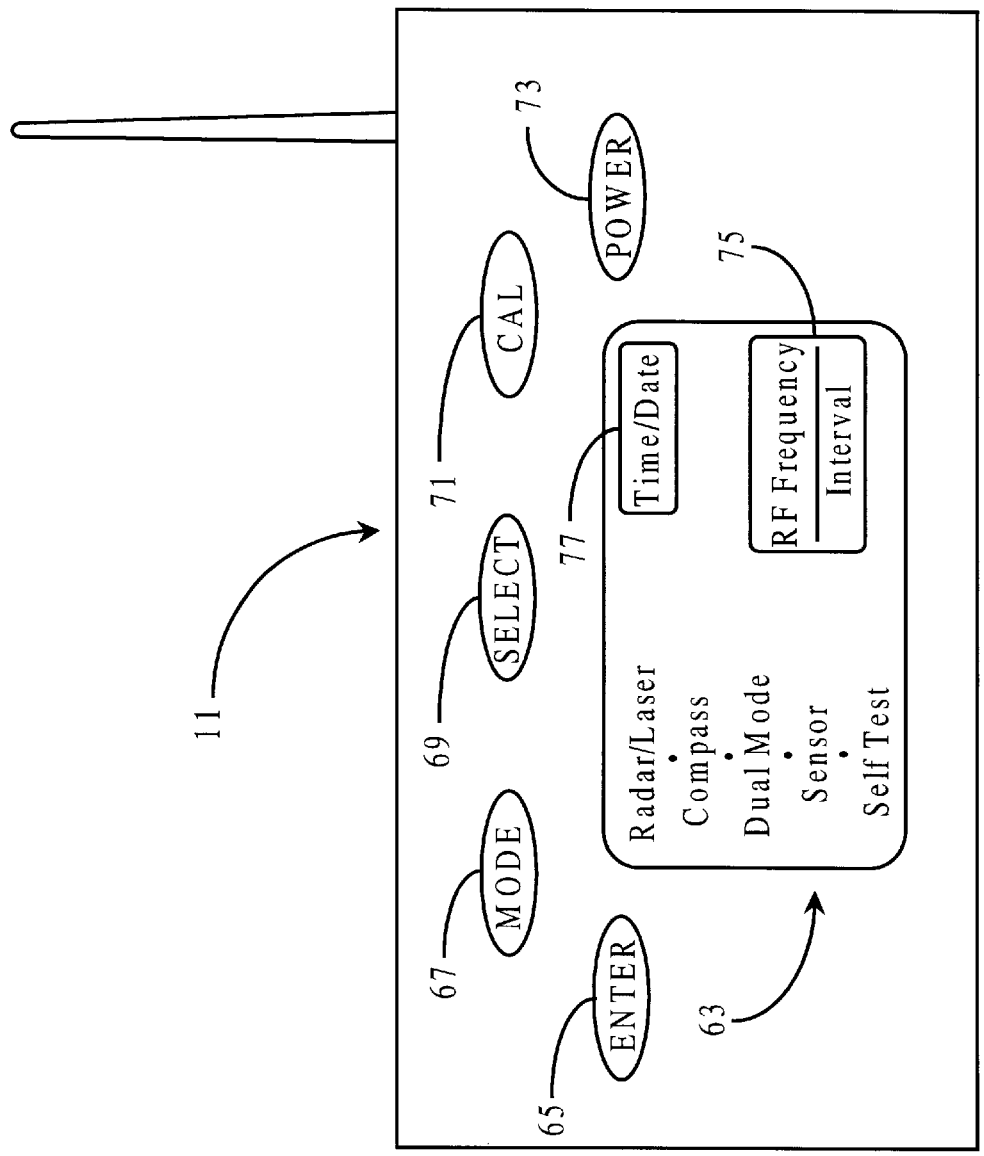
FIG. 4 is an exemplary user-display interface of the multi-sensing detection system of FIG. 1 according to an embodiment of the present invention.
Figure 5:
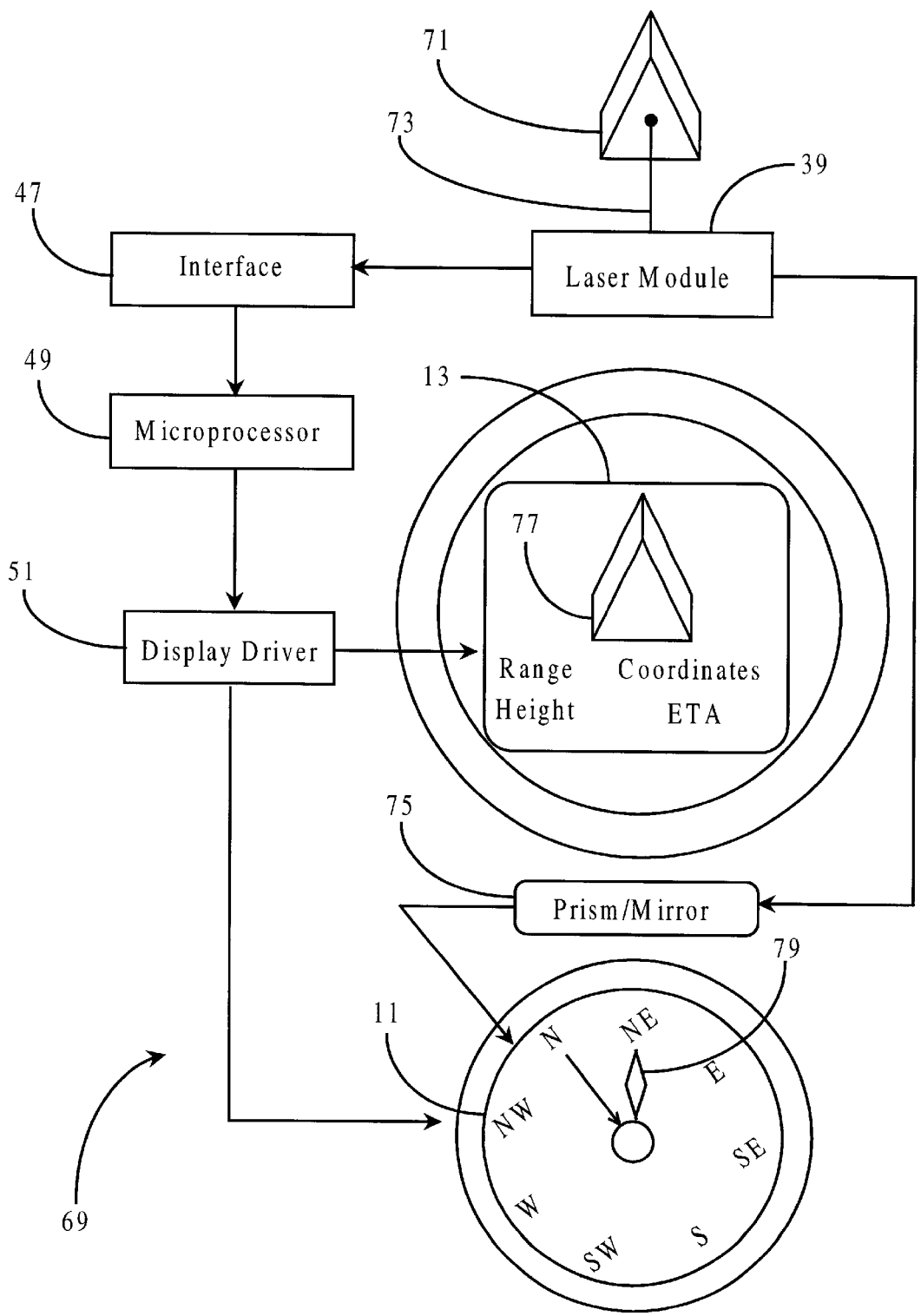
FIG. 5 is a block diagram of a multi-sensors detection system according to the embodiment of the present invention.

FIG. 4 is an exemplary user-display interface for detector 11 of FIG. 1 according to an embodiment of the present invention. Detector 11 has a display window 63 (LCD) adapted for displaying such as sensor readings, alerts and other indicia, and also has an array of user-operable control buttons for selecting functionality.

A power button 73 is provided and adapted to allow powering on of detector 11 and sensor packet 15 in some embodiments. For example, one power button such as button 73 may power up unit 11 and transmit the required command to power up such as sensor packet 15 of FIG. 1, so both power up in tandem. In another embodiment, unit 11 may be automatically powered on such as when the vehicle is started. There are many alternative possibilities.

Display window 63 is, in a preferred embodiment, a liquid crystal display (LCD) display. Display window 63 may also be of any other suitable type of known display technology such as light emitting diode (LED) type display. Window 63 is adapted to display any results obtained and reported by the system of the present invention. Window 63 also displays resident types of information such as the time or data represented by element number 77, and any display parameters associated with routine operation such as current RF frequency indicators and sensor interval readings represented by element number 75.

An enter button 65 is provided and adapted to allow a user to enter information into detector 11 such as information needed to "train" the system to a particular vehicle's parameters or other user applied data. Other known data or user-applied data of the type previously described in this specification includes such as inclination data for a particular stretch of roadway, roadway curve parameters, and so on. User applied data may be entered in any number of several ways. For example, a small keyboard (not shown) may be provided for the purpose of typing in certain parameters to the system, and there would be a connector for the keyboard. Limited audio input capability may also be used if a microphone and appropriate audio circuitry is included. In one embodiment, options representing user-data sets are already stored in such as memory 37 of FIG. 2 and are displayable and accessible through window 63.

Enter button 65 may also be used in conjunction with other buttons provided such as a select button 69, which is adapted to allow a user to highlight options presented in display window 63. For example, by selecting and then entering an available option presented in display window 63, a user may effect the command associated with the chosen option. Enter button 65 may also be used to store certain mode combinations into memory such that it is the first presented mode when the system is powered off and then back on again.

A mode button 67 is provided and adapted to allow a user to call up to display window 63 the various modes or options associated with basic operation of the system. The system of the present invention is not limited to any particular mode or combination of modes. Listed in window 63 are radar/laser mode, compass mode, dual mode (compass and radar/laser), sensor mode (specific sensor), and self-test. For example, radar/laser mode allows operation to sense radar and or laser only. Compass mode allows only compass operation. Dual mode allows both radar/laser and compass operation simultaneously. Sensor mode may be used to operate only a specific sensor, or a specific combination of sensors, and to display results based on processed sensor readings. The self-test mode puts the system through a series of pre-operative tests. The self-test mode may be programmed to start automatically when detector 11 is powered on. Select button 69 may be used to select the mode options listed above, and enter button 65 may be used to effect those mode options.

With respect to various modes of operation, it is the intent of the inventor that all combinations of sensor operation may be performed in concert or selected to perform individually. There are no limitations except in the event that due to the type of sensor function, one sensor interferes with the function of another sensor during simultaneous operation. The inventor knows of no such limitation concerning any of the sensors described in this specification.

A calibration button (CAL) 71 is provided and adapted to allow a user to perform required calibrations that may be a prerequisite for certain sensor functions such as a compass function. For example, a user may have to depress CAL 71 to call up calibration instructions in window 63 such as turn the vehicle in two complete circles to obtain compass headings, etc.

It will be apparent to one with skill in the art that there may be more or fewer user operable buttons of varying function than the ones described above without departing from the spirit and scope of the present invention. For example, instead of having a select and enter button, one button may be provided for toggle operation through modes. For example rapidly depressing and releasing the button may enable a toggle through all of the offered modes. When a mode is selected, holding down the toggle button for such as two or three seconds may enter the mode. There are many possibilities.

In one embodiment, voice recognition is used to effect operation of the multi-sensing system of the present invention. Voice recognition technology is known in the art and is suitable for initiating many defined functions. Command words such as Compass Mode, Dual Mode, Radar Only, and so on may be easily programmed into and recognized by the system.

In yet another embodiment of the system sensors are included and monitored to track the magnitude and frequency of changes in steering direction for a subject vehicle, and the data thus generated is compared with stored patterns known to be associated with drivers periodically dozing or falling asleep while driving. When a match is found, indicating a significant possibility that the driver of the sensed vehicle with which the system of the invention is associated has fallen asleep or is periodically dozing, an alert is sounded to warn the driver sternly of the imminent danger.

In some embodiments incorporating the doze warning system an escalating system of warnings is used, at an early level warning the driver, such as by a digitally recorded message, that there is a danger of dozing, and at an opposite extreme a loud klaxon to rudely awaken a driver determined to have fallen asleep.

It will be apparent to one with skill in the art that the method and apparatus of the present invention may be applied to other vehicles other than passenger or commercial vehicles. A marine version may be applied to certain watercraft such as pleasure boats, cabin cruisers, and the like. Special implementations may be made to such as construction or rescue vehicles. Special sensor capabilities known to benefit those in the rescue or construction fields may be added to or provided in place of other sensors in a sensor packet such that a system may be tailored for specific use. Such alternate sensor capabilities may include a methane-gas sensor for such as a pay loader, or an infrared heat sensor for a search and rescue vehicle.

Some of the alternate uses of the system of the present invention may not require a radar/laser sensor capability in as far as certain types of vehicles would not be subject to speed detection from such as law enforcement. However a multi-sensing system of the present invention may still be provided without the radar/laser option.

The method and apparatus of the present invention should be afforded the broadest scope possible. The method and apparatus of the present invention is limited only by the claims that follow.

What is claimed is:

1. A detection, alert and reporting system for a vehicle, comprising:
   one or both of a radar and a laser detector for sensing radar or laser signals directed on the vehicle to track vehicle speed;
   one or more environmental sensors, for sensing conditions external to the mechanical functions of the vehicle including environmental characteristics;
   a microcontroller for managing system functions;
   an electronic memory for storing data, algorithms, and operating routines;
   an audio system and doze-alert software executed in the background at times the vehicle is in motion; and
   a display for reporting system results to a user;
   wherein the system monitors input from one or both of the radar and laser detector and from at least one environmental sensor, and uses the input in conjunction with system control routines and stored data to provide reports to the user, and to determine if the driver of the vehicle may doze or is dozing, sounding an audible warning alert to the driver via the audio system when a condition of dozing is determined.

2. The system of claim 1 wherein the one or more environmental sensors include sensors for one or more of vehicle blind spot detection, outside temperature, wind velocity, wind direction, air pressure, humidity, altimeter, or the Earth's magnetic field.

3. The system of claim 1 further comprising an interactive user interface enabling the user to at least input data for use in providing reports to the driver, the determination of the driver's state of awareness and to select alternative functions for the system.

4. The system of claim 1 wherein the doze-alert software operates on an escalating scheme, wherein separate determinations are made based on sensor inputs as to a level of danger, and separate alerts are made, each one more urgent than the last as determined danger increases.

5. A method for alerting a driver of a vehicle to impending danger occasioned by the driver's level of awareness, comprising steps of:
   (a) determining vehicle characteristics that evidence lack of driver awareness;
   (b) providing an input apparatus for a user to input characteristics;

(c) providing sensors in the vehicle enabled to monitor the vehicle characteristics, and for monitoring environmental characteristics external to the mechanical operation of the vehicle;

(d) programming an electronic warning system to store characteristics as a standard that indicates lack of awareness, and to compare real-time characteristics to the stored standard; and (e) comparing real-time vehicle characteristics, including input from said sensors, with the stored standard and sounding an alert for the driver if a determination is made that the driver is in danger.

6. The method of claim 5 wherein, in step (b) patterns of movement of the vehicle's steering mechanisms are monitored, and in step (c) real-time movement of steering mechanisms are compared with the standard.

7. The method of claim 5 wherein, in step (c) the programming stores plural standards indicating different levels of awareness, and in step (d) escalating alerts are sounded.

8. The method of claim 5 wherein, in step (c) the characteristics being stored as a standard may also be entered by an user input apparatus.

* * * * *